US005936162A

United States Patent [19]

Lingenberg et al.

[11] Patent Number: 5,936,162

[45] Date of Patent: Aug. 10, 1999

[54] METHOD FOR THE PRODUCTION OF ULTRASOUND WAVES FOR NONDESTRUCTIVE MATERIALS TESTING AND AN ULTRASOUND TEST INSTRUMENT

[75] Inventors: Dieter Lingenberg, Frankfurt; Rainer Meier, Erlangen, both of Germany

[73] Assignee: Siemens Aktiengesellschaft, Munich, Germany

[21] Appl. No.: 08/931,215

[22] Filed: Sep. 16, 1997

[30] Foreign Application Priority Data

Sep. 13, 1996 [DE] Germany .......................... 196 37 424

[51] Int. Cl.[6] .................................................... G01N 29/04

[52] U.S. Cl. .............................................................. 73/643

[58] Field of Search ............................ 73/643, 576, 578; 367/140; 324/207.15

[56] References Cited

U.S. PATENT DOCUMENTS

| | | | |
|---|---|---|---|
| 4,138,896 | 2/1979 | Kopineck et al. | 73/643 |
| 4,395,913 | 8/1983 | Peterson | 73/643 |
| 4,420,978 | 12/1983 | Robinson et al. | 73/643 |
| 5,050,703 | 9/1991 | Graff et al. | 181/106 |
| 5,148,414 | 9/1992 | Graff et al. | 367/140 |
| 5,154,081 | 10/1992 | Thompson et al. | 73/597 |
| 5,164,921 | 11/1992 | Graff et al. | 367/140 |
| 5,421,203 | 6/1995 | Graff et al. | 73/643 |
| 5,503,020 | 4/1996 | Mandracchia | 73/643 |

FOREIGN PATENT DOCUMENTS

| | | |
|---|---|---|
| 0451375A1 | 10/1991 | European Pat. Off. . |
| 0579255B1 | 1/1994 | European Pat. Off. . |
| 2726827 | 2/1978 | Germany . |
| 4204643C1 | 5/1993 | Germany . |
| 4301622C1 | 2/1994 | Germany . |
| 96/01424 | 1/1996 | WIPO . |

OTHER PUBLICATIONS

Japanese Patent Abstract No. 60–70352 (Morimoto), dated Apr. 22, 1985.

Japenese Patent Abstract No. 3–84455 (Sato), dated Apr. 10, 1991.

*Primary Examiner*—Hezron Williams
*Assistant Examiner*—Richard A. Moller
*Attorney, Agent, or Firm*—Herbert L. Lerner; Laurence A. Greenberg

[57] ABSTRACT

A method for the production of ultrasound waves for non-destructive materials testing of a workpiece. The method includes providing at least one radio frequency coil disposed in an essentially uniform magnetic field. The at least one radio frequency coil has a longitudinal axis disposed parallel to a surface of a workpiece. The method also includes producing horizontally polarized transverse ultrasound waves in the workpiece due to an interaction of the magnetic field with eddy currents in the workpiece. The eddy currents are supplied by the at least one radio frequency coil. The invention also teaches a device for implementing the method.

16 Claims, 1 Drawing Sheet

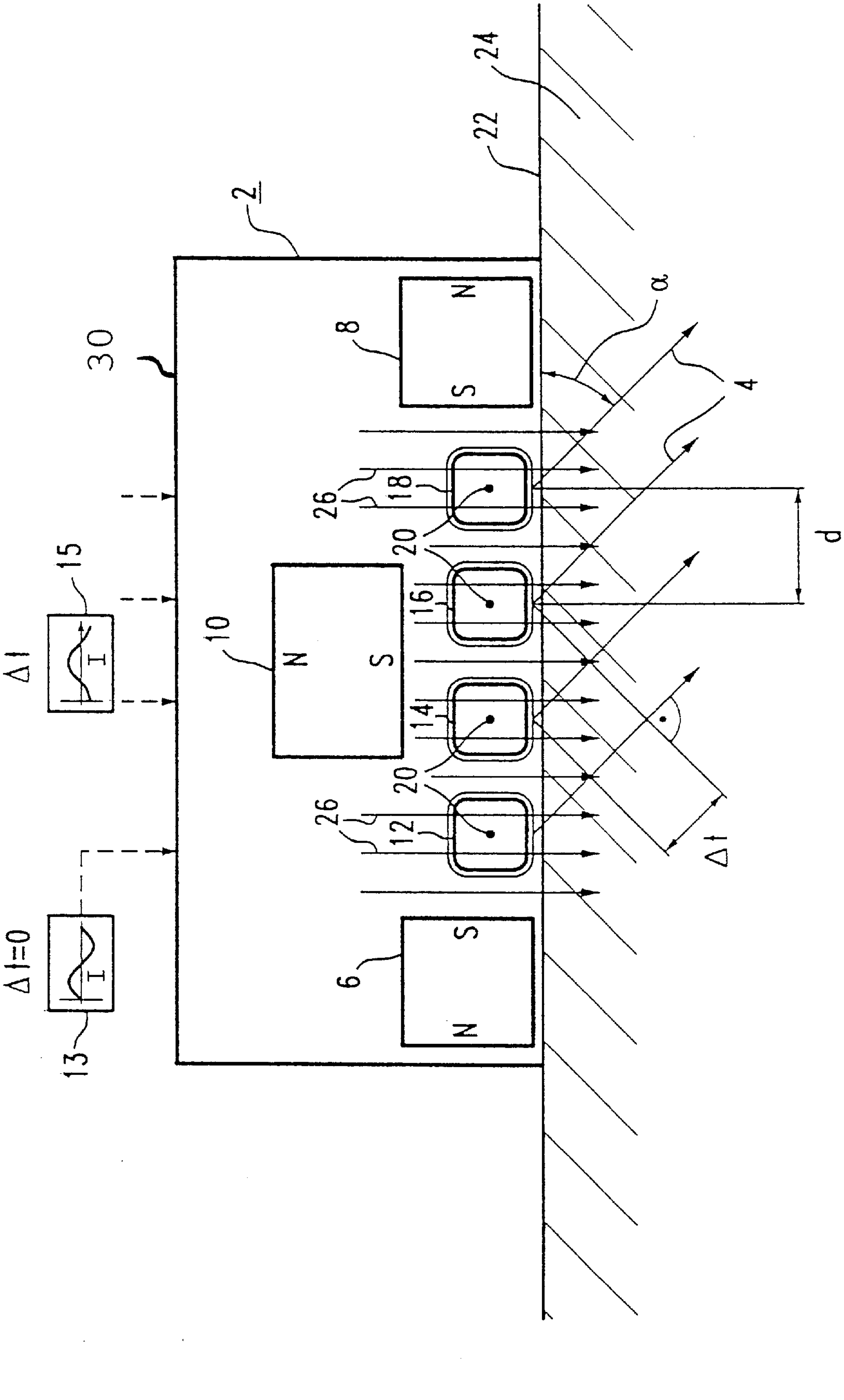
2
30
N
S
d
α
4
6
8
10
12
13
14
15
16
18
20
22
24
26

METHOD FOR THE PRODUCTION OF ULTRASOUND WAVES FOR NONDESTRUCTIVE MATERIALS TESTING AND AN ULTRASOUND TEST INSTRUMENT

BACKGROUND OF THE INVENTION

Field of the Invention

The invention relates to a method for the production of ultrasound waves for nondestructive materials testing, and to a test instrument.

Ultrasonic testing is a nondestructive materials testing method for detecting cracks, inclusions, non-uniformities and other defects. In this case, the ultrasound is, for example, produced piezoelectrically or electrodynamically.

With electrodynamic ultrasound production, the ultrasound is produced directly in the test piece, so that there is no need for a coupling medium. The creation of the ultrasound vibrations is attributable to the interaction of radio frequency eddy currents with a magnetic field. The eddy currents are, for example, produced by a radio frequency coil which is brought close to the surface of the workpiece. As a result of a magnetic field acting at the same time, Lorentz forces are created, which produce sound waves in the workpiece. Depending on the relative orientation of the magnetic field and the coil which produces the eddy currents, it is possible to excite longitudinal waves and arbitrarily polarized transverse waves. In the case of a longitudinal wave, the propagation direction and the vibration direction are identical, whereas with a transverse wave the vibration direction is perpendicular to the propagation direction. A transverse wave is also referred to as a shear wave and propagates only in solid media.

If the polarization direction lies in the plane spanned by the normal to a surface of the workpiece and the propagation direction of the ultrasound, then the waves are referred to as vertically polarized transverse waves. If, however, the polarization direction lies perpendicular to this plane, the waves are referred to as horizontally polarized transverse waves. For use in testing, horizontally polarized transverse waves can be produced only by electrodynamic excitation.

With electrodynamic ultrasound production, it is possible to test the workpiece at temperatures of up to about 1000 K.

German Patent DE 42 04 643 C1 discloses a testing instrument having permanent magnets which are oriented at right angles and whose orientation alternates in checkerboard fashion. In this case, the orientation is defined as being the direction between the north and south poles of the permanent magnet. In this instrument, the conductive tracks of the radio frequency coil are arranged in meander fashion between a surface of the workpiece and the permanent magnets. This testing instrument is very expensive to produce, since the transmit or receive coil needs to be wound very thin in a planar shape. At the hitherto customary testing frequencies of about 0.7 MHz, this can be done only with great outlay. However, frequencies of between 1 and 2 MHz are usual for testing thin-walled components and pipelines. In order to achieve this, the permanent magnet arrangements and radio frequency coil arrangements need to be reduced in size according to the frequency. Reproducible production of testing instruments of this type therefore becomes very expensive.

European Patent EP 0 579 255 B1 discloses a further test instrument, in which the eddy currents needed for the excitation of sound are induced through the use of a magnet yoke enclosing the permanent magnets. The distance between the two pole pieces of the magnet yoke therefore becomes undesirably large. This testing instrument therefore has an efficiency, in terms of sound excitation and sound reception, which is strongly dependent on the material to be tested, and, by way of example, satisfactory results have not yet been achieved with nonmagnetic components. However, it is precisely with nonmagnetic weld seams and hybrid seams that, because of the columnar crystals through which sound is to be passed, it is particularly suitable to use horizontally polarized waves, which for all intents and purposes can only be produced electrodynamically.

A factor common to the test instruments known from the prior art, when using horizontally polarized transverse ultrasound waves, is that one or more radio frequency coils for exciting the ultrasound waves are arranged in magnetic fields which are arranged with alternating polarity and are produced by a multiplicity of permanent magnets. A problem which then arises is that, in order to change the angle of incidence $\alpha$, it is necessary not only to drive the individual radio frequency coils as a function of time, but also to change the excitation frequency of the ultrasound waves. In this case, in order to produce different angles of incidence $\alpha$, different excitation frequencies need to be used. An angle of incidence of 0° cannot in this case be achieved. The angle of incidence $\alpha$ is defined as being the angle between the propagation direction of the ultrasound waves in the workpiece and the normal to the surface of the workpiece. The angle of incidence $\alpha$ has the following functional dependence $$\sin\alpha = \frac{\lambda}{\lambda_s}$$

$\lambda$ being the wavelength of the ultrasound wave, and $\lambda_s$ being the track wavelength which is determined by the periodicity of the static magnetic field. Since the wavelength $\lambda$ depends on the frequency $\nu$, the angle of incidence $\alpha$ is therefore also dependent on the frequency $\nu$.

SUMMARY OF THE INVENTION

It is accordingly an object of the invention to provide a method for the production of horizontally polarized transverse ultrasound waves for nondestructive materials testing, which overcomes the herein mentioned disadvantages of the heretofore-known devices and methods of this general type, and which ensures simple production of ultrasound waves. A further intention is to provide a test instrument for carrying out the method, which ensures efficient production and reception of ultrasound waves and is at the same time inexpensive to produce.

According to a further object, the angle of incidence of the ultrasound waves should be easy to set for nondestructive materials testing without needing to change the frequency.

With the foregoing and other objects in view there is provided, in accordance with the invention, a method for the production of ultrasound waves for nondestructive materials testing of a workpiece, which comprises providing at least one radio frequency coil disposed in an essentially uniform magnetic field, the at least one radio frequency coil has a longitudinal axis disposed parallel to a surface of a workpiece; and producing horizontally polarized transverse ultrasound waves in the workpiece due to an interaction of the magnetic field with eddy currents in the workpiece, the eddy currents supplied by the at least one radio frequency coil.

With the foregoing and other objects in view there is also provided, in accordance with the invention, a method for the production of ultrasound waves for nondestructive materials testing of a workpiece, which comprises producing a virtually uniform magnetic field associated with a surface of a workpiece; providing a plurality of radio frequency coils each having a longitudinal axis, each of the longitudinal axes disposed next to one another and virtually parallel to one another and aligned with the surface of the workpiece; and providing each of the radio frequency coils with a radio frequency alternating current, a frequency of the alternating current is the same in all of the radio frequency coils for producing ultrasound waves in the workpiece.

In accordance with an added feature of the invention, there is the step of providing the alternating currents of respectively neighboring radio frequency coils with a predetermined time delay, and a propagation direction of the ultrasound waves in the workpiece predetermined by the time delay.

In accordance with another feature of the invention, there is the step of aligning the magnetic field approximately perpendicular to the surface of the workpiece.

With the foregoing and other objects in view there is provided, in accordance with the invention, a test instrument for nondestructive materials testing of a workpiece using horizontally polarized transverse ultrasound waves, comprising at least three magnets; and at least one radio frequency coil having a longitudinal axis, the at least one radio frequency coil disposed with the longitudinal axis parallel to a surface of a workpiece and disposed between the at least three magnets.

In accordance with an additional feature of the invention, the at least three magnets have a first and a second magnet, the first and second magnets are disposed in a plane of the at least one radio frequency coil and are aligned parallel with the surface of the workpiece.

In accordance with yet another added feature of the invention, the at least three magnets have a third magnet, the third magnet is disposed above the at least one radio frequency coil, and is disposed perpendicular to the surface of the workpiece.

In accordance with yet another feature of the invention, the at least three magnets are permanent magnets.

In accordance with yet another additional feature of the invention, the at least three magnets are formed of a soft magnetic material.

In accordance with an added feature of the invention, the at least three magnets are electromagnets.

With the foregoing and other objects in view there is further provided, in accordance with the invention, a test instrument for nondestructive materials testing of a workpiece using ultrasound waves, comprising a magnet arrangement for producing a virtually uniform magnetic field; and a plurality of radio frequency coils each having a longitudinal axis, the plurality of radio frequency coils disposed next to one another in the uniform magnetic field, and each of the longitudinal axes disposed virtually parallel to one another and aligned with a surface of a workpiece.

In accordance with an added feature of the invention, each radio frequency coil is provided with a power supply, and the power supplies of neighboring radio frequency coils produce a radio frequency of alternating currents with a predeterminable time delay.

In accordance with another feature of the invention, the virtually uniform magnetic field is aligned approximately perpendicular to the surface of the workpiece.

In accordance with a concomitant feature of the invention, the magnet arrangement contains a plurality of magnets, and the plurality of radio frequency coils are disposed between the plurality of magnets.

In order easily to set the angle of incidence of ultrasound waves in a workpiece for nondestructive materials testing, the invention provides for a virtually uniform magnetic field to be produced and for a plurality of radio frequency coils to be each fed with a radio frequency alternating current, the frequency of which is the same in all the coils. In this case, the radio frequency coils are arranged next to one another in the uniform magnetic field in such a way that their longitudinal axes are approximately parallel to one another and are aligned with the surface of the workpiece.

A corresponding test instrument contains a magnet arrangement for producing a virtually uniform magnetic field, and a plurality of radio frequency coils which are arranged next to one another in the uniform magnetic field and have longitudinal axes which are virtually parallel to one another and are aligned with the surface of the workpiece. Preferably, each radio frequency coil is assigned its own power supply, the power supplies of neighboring coils generating alternating currents with a predeterminable time delay.

In this case, the radio frequency coils are arranged in one and the same magnetic field. The superposition of a plurality of sound waves from a plurality of neighboring radio frequency coils provides a sufficiently strong signal for the materials testing at an angle of incidence $\alpha$.

In contrast to the test instruments known from the prior art, the radio frequency coils are thus arranged in an essentially uniform magnetic field, and no longer in alternating magnetic fields. Conversely, a high-frequency alternating magnetic field is produced which is aligned at right angles or at least obliquely with respect to the uniform magnetic field, but parallel to the surface of the workpiece. The following functional relationship is then found for the angle of incidence $\alpha$ $$\sin\alpha = \frac{v_t \cdot \Delta t}{d},$$

$v_t$ being the velocity of the ultrasound waves in the workpiece, $\Delta t$ being the drive delay time between two neighboring radio frequency coils, and d being the distance between the radio frequency coils.

Since the velocity $v_t$ of the ultrasound waves and the distance d of the radio frequency coils from one another are constants in the functional relationship, the angle of incidence $\alpha$ is dependent only on the delay time $\Delta t$. This means that in order to change the angle of incidence $\alpha$, it is no longer necessary to change the frequency $\nu$ of the ultrasound waves to be produced. This method therefore permits simple and efficient production of ultrasound waves in the workpiece at a predetermined angle of incidence $\alpha$. The magnet arrangement preferably comprises three magnets.

Preferably, the magnetic field is aligned perpendicular to the surface of the workpiece, that is to say also perpendicular to the radio frequency coils. However, an oblique alignment is also possible, for example if spatial conditions so require.

In particular, the first two magnets are arranged in the plane of the radio frequency coil, and their orientations are aligned parallel with the surface of the workpiece.

In a further configuration, the third magnet is arranged above the radio frequency coil, its orientation being perpendicular to the surface. With this arrangement of the magnets, an essentially uniform magnetic field is produced, in which the radio frequency coil is arranged.

Preferably, the longitudinal axis of the radio frequency coil is arranged parallel to the surface of the workpiece.

In a further configuration, the distance between the radio frequency coils is as small as possible.

Preferably, the diameter of the radio frequency coils is in each case approximately one half of the wavelength λ of the ultrasound waves to be produced. By virtue of this measure, each radio frequency coil produces a soundwave beam which is wide in comparison with the angle of incidence α, which in turn allows the test instrument a wide angular range.

Other characteristic features of the invention are set forth in the appended claims.

Although the invention is illustrated and described herein as embodied in a method and test instrument for producing ultrasound waves for nondestructive materials testing, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a diagramatic view of an ultrasound test instrument according to the invention.

DESCRIPTION OF THE PREFERRED EMBODIMENTS

Referring now to the single FIGURE of the drawing in detail, there is shown a test instrument for nondestructive materials testing of a workpiece using horizontally polarized transverse ultrasound waves.

In the illustrative embodiment according to the FIGURE, a test instrument 2 for materials testing of a workpiece 24 using horizontally polarized transverse ultrasound waves 4 is configured with three magnets 6, 8, 10 and the radio frequency coils 12, 14, 16 and 18, the latter being arranged between the magnets 6, 8, 10. The magnets 6, 8, 10 and the radio frequency coils are contained within a housing 30 of the test instrument.

The radio frequency coils 12, 14, 16 and 18 are each fed by their own power supply (only power supplies 13, 15 for the coils 12, 14 next to one another are represented). The power supplies used in this case are pulse width modulated inverters which apply a pulse width modulated radio frequenecy AC voltage to the coils. A pulse width modulated inverter of this type makes it possible, by defining a (for example sinusoidal) set curve, to dictate not only the frequency but also the time of the zero crossings of the current or voltage. It can be seen from the symbols on the power supply that the current in coil 14 has, relative to the current in coil 12, a phase shift which is determined by a time delay Δt for the power supply.

The longitudinal axes 20 of the radio frequency coils 12, 14, 16 and 18 are in this case arranged parallel to a surface 22 of the workpiece 24 to be tested and parallel to one another. The distance between the radio frequency coils 12, 14, 16 and 18 are in this case as small as possible. The radio frequency coils 12, 14, 16 and 18 are coupled to the surface 22 of the workpiece 24 via a non-illustrated protective layer.

The first and second magnets 6, 8 are arranged in the plane of the radio frequency coils 12, 14, 16 and 18, their orientations being parallel to the surface 22. The third magnet 10 is arranged above the radio frequency coils 12, 14, 16 and 18, its orientation being perpendicular to the surface 22. This arrangement of the magnets 6, 8, 10 produces an essentially uniform magnetic field 26 which is aligned perpendicular to the surface 22 of the workpiece 24 and is located between the magnets 6, 8, 10. The coils 12, 14, 16 and 18 are therefore arranged in this magnetic field 26. Use is no longer made of alternating magnetic fields, as are known from the prior art.

Since the time-dependent magnetic field of the radio frequency coils 12, 14, 16 and 18 in the outer region of the workpiece 24 extends parallel to the surface 22 of the workpiece, the eddy currents produce transverse waves in the workpiece.

The following functional relationship is then found for the angle of incidence α

$$\sin\alpha = \frac{v_t \cdot \Delta t}{d},$$

vt being the velocity of the ultrasound waves 4 in the workpiece 24, Δt being the delay time between the driving of the power supplies for two neighboring radio frequency coils, 12, 14; 14, 16; 16, 18, and d being the distance between the radio frequency coils 12, 14, 16 and 18.

Since the velocity $v_t$ of the horizontally polarized transverse ultrasound waves 4 and the distance d of the radio frequency coils 12, 14, 16 and 18 from one another are constants in the functional relationship, the angle of incidence α is then dependent only on the delay time Δt. This means that in order to change the angle of incidence α, it is no longer necessary to change the frequency n of the ultrasound waves 4 to be produced. It is merely necessary to change the drive delay time Δt between two neighboring radio frequency coils 12, 14; 14, 16; and 16, 18. This method therefore permits simple and efficient production of ultrasound waves 4 in the workpiece 22 at a predetermined angle of incidence α.

The diameter of the radio frequency coils 12, 14, 16 and 18 is in each case about one half of the wavelength λ of the ultrasound waves 4 to be produced.

The magnets 6, 8, 10 are permanent magnets made of a soft magnetic material. However, they may also be configured as electromagnets.

We claim:

1. A method for the production of ultrasound waves for nondestructive materials testing of a workpiece, which comprises:

providing at least one radio frequency coil disposed in an essentially uniform magnetic field, the at least one radio frequency coil having a coil axis disposed parallel to a surface of a workpiece; and producing horizontally polarized transverse ultrasound waves in the workpiece due to an interaction of the magnetic field with eddy currents in the workpiece, the eddy currents supplied by the at least one radio frequency coil.

2. The method according to claim 1, which comprises aligning the magnetic field approximately perpendicular to the surface of the workpiece.

3. A method for the production of ultrasound waves for nondestructive materials testing of a workpiece, which comprises:

producing a virtually uniform magnetic field associated with a surface of a workpiece;

providing a plurality of radio frequency coils each having a coil axis, each of the coil axes disposed next to one another and virtually parallel to one another and with the surface of the workpiece; and providing each of the radio frequency coils with a radio frequency alternating current, a frequency of the alternating current being the same in all of the radio frequency coils for producing ultrasound waves in the workpiece.

4. The method according to claim 3, which comprises providing the alternating currents of respectively neighboring radio frequency coils with a predetermined time delay, and a propagation direction of the ultrasound waves in the workpiece predetermined by the time delay.

5. The method according to claim 3, which comprises aligning the magnetic field approximately perpendicular to the surface of the workpiece.

6. The method according to claim 3, which comprises supplying a first radio frequency coil with a first alternating current having a time delay with respect to a second alternating current supplied to a second radio frequency coil being disposed next to said first radio frequency coil.

7. A test instrument for nondestructive materials testing of a workpiece using horizontally polarized transverse ultrasound waves, comprising:

at least three magnets; and at least one radio frequency coil having a coil axis, said at least one radio frequency coil disposed with said coil axis parallel to a surface of a workpiece and disposed between said at least three magnets.

8. The test instrument according to claim 7, wherein said at least three magnets have a first and a second magnet, said first and second magnets are disposed in a plane of said at least one radio frequency coil and are aligned parallel with the surface of the workpiece.

9. The test instrument according to claim 8, wherein said at least three magnets have a third magnet, said third magnet is disposed above said at least one radio frequency coil, and is disposed perpendicular to the surface of the workpiece.

10. The test instrument according to claim 7, wherein said at least three magnets are permanent magnets.

11. The test instrument according to claim 10, wherein said at least three magnets are formed of a soft magnetic material.

12. The test instrument according to claim 7, wherein said at least three magnets are electromagnets.

13. A test instrument for nondestructive materials testing of a workpiece using ultrasound waves, comprising:

a magnet arrangement for producing a virtually uniform magnetic field; and a plurality of radio frequency coils each having a coil axis, said plurality of radio frequency coils disposed next to one another in said uniform magnetic field, and each of said coil axes disposed virtually parallel to one another and aligned with a surface of a workpiece.

14. The test instrument according to claim 13, wherein each radio frequency coil is provided with a power supply, and said power supplies of neighboring radio frequency coils produce a radio frequency of alternating currents with a predeterminable time delay.

15. The test instrument according to claim 13, wherein said virtually uniform magnetic field is aligned approximately perpendicular to the surface of the workpiece.

16. The test instrument according to claim 13, wherein said magnet arrangement contains a plurality of magnets, and said plurality of radio frequency coils are disposed between said plurality of magnets.

* * * * *